(12) United States Patent
Chen

(10) Patent No.: US 8,121,093 B2
(45) Date of Patent: Feb. 21, 2012

(54) APPARATUS AND METHOD FOR ALLEVIATING BARRED ACCESS IN MOBILE COMMUNICATION SYSTEM

(75) Inventor: Teming Chen, San Diego, CA (US)

(73) Assignee: Via Telecom, Inc., San Diego, CA (US)

( * ) Notice: Subject to any disclaimer, the term of this patent is extended or adjusted under 35 U.S.C. 154(b) by 437 days.

(21) Appl. No.: 12/409,748

(22) Filed: Mar. 24, 2009

(65) Prior Publication Data

US 2010/0074170 A1    Mar. 25, 2010

Related U.S. Application Data

(60) Provisional application No. 61/098,798, filed on Sep. 22, 2008.

(51) Int. Cl.
*H04W 4/00* (2009.01)
(52) U.S. Cl. ........................................................ 370/331
(58) Field of Classification Search .................... 370/331
See application file for complete search history.

(56) References Cited

U.S. PATENT DOCUMENTS

2003/0207702 A1* 11/2003 Chen ............................. 455/574
2004/0203778 A1* 10/2004 Kuo et al. ..................... 455/436

OTHER PUBLICATIONS

3GPP Technical Specification TS 36.331 V8.1.0 (Mar. 2008).*
Chinese language office action dated Mar. 24, 2011.
3rd Generation Partnership Project; Technical Specification group Radio Access Network; Evolved Universal Terrestrial Radio Access(E-UTRA) Radio Resource Control (RRC); Protocol specification(Release 8); Dec. 31, 2008; pp. 1-198.

* cited by examiner

*Primary Examiner* — Ayaz Sheikh
*Assistant Examiner* — Hai-Chang Hsiung
(74) *Attorney, Agent, or Firm* — Thomas|Kayden

(57) ABSTRACT

A user equipment for alleviating barred access while reselecting from a first cell to a second cell in a mobile communication system is provided. A wireless module detects receives system information broadcasted in the first cell. A storage unit stores the system information. A controller reselects from the first cell to the second cell, determines whether a first barred access timer is running, and stops the first barred access timer and informs the upper layer of an RRC protocol that the access of the first service is allowed in response of that the first barred access timer is running.

12 Claims, 5 Drawing Sheets

APPARATUS AND METHOD FOR ALLEVIATING BARRED ACCESS IN MOBILE COMMUNICATION SYSTEM

CROSS REFERENCE TO RELATED APPLICATIONS

This Application claims priority of U.S. Provisional Application No. 61/098,798, filed Sep. 22, 2008.

BACKGROUND OF THE INVENTION

1. Field of the Invention

The invention generally relates to alleviating barred access and, more particularly, to an apparatus, such as a user equipment or a chipset for the user equipment, and a method for a radio resource control (RRC) protocol to alleviate barred access while reselecting from a first cell to a second cell in a mobile communication system.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, a mobile user equipment (UE) communicates via a radio access radio network (RAN) to one or more core networks. A UE comprises various types of equipment such as a mobile telephone (also known as cellular or cell phone), a laptop with wireless communications capability, a personal digital assistant (PDA) etc. These may be portable, handheld, pocket-sized, installed in a vehicle etc. and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within the range of the base station. Several base stations may be connected to a radio network controller (RNC) which controls various activities of the base stations. The radio network controllers are typically connected to a core network.

A universal mobile telecommunications system (UMTS) is a third generation mobile communication system that has evolved from the Global System for Mobile communications (GSM) system. The UMTS is a European standard which aims to provide better mobile communication services based on the GSM core network and wideband code division multiple access (W-CDMA) technology. While UMTS delivers high data transfer rates, wireless data usage is expected to increase significantly over the next few years. For this reason, concepts for UMTS Long Term Evolution (LTE) have been proposed and the objective is to further improve UMTS to achieve high-data-rates, low-latency and packet-optimized radio access technology. The improved UMTS is called Evolved Universal Terrestrial Radio Access (E-UTRA).

For a wireless mobile device, generally referred to as a UE, which complies with a 3GPP specification for an E-UTRA protocol, the 3GPP TS 36.331 specification, v.8.3.0, referred to herein as the 36.331 specification, defines the E-UTRAN RRC (Radio Resource Control) protocol requirements between the E-UTRA Terrestrial Radio Access Network (E-UTRAN) and the UE. The 3GPP TS 36.304 specification, v.8.3.0, referred to herein as the 36.304 specification, defines the E-UTRAN RRC protocol requirements for the UE in an idle mode.

Clause 8.1.1 of the 36.331 specification, relates to the broadcast of system information. The E-UTRAN sends system information to a UE by means of a message that comprises a Master Information Block (MIB) and a plurality of System Information Blocks (SIBs), as illustrated in FIG. 1. The MIB provides references and scheduling information for a number of system information blocks. A system information block groups together system information elements of the same nature. Different system information blocks may have different characteristics, e.g. repetition rates and the requirements on UEs to re-read system information blocks. The system information blocks contain the actual system information. The master information block may optionally also contain reference and scheduling information of one or two scheduling blocks, which give references and scheduling information for additional system information blocks. Scheduling information for a system information block is included in either the master information block or one of the scheduling blocks.

In accordance with clause 5.3.7.2 of the 36.331 specification and clause 5.2 of the 36.304 specification, before a UMTS cell is selected by a mobile device, the system information of the cell, including MIB and SIBs, is read on the broadcast control channel (BCCH). Together with the detected signal strength of the cell, a UE can then determine whether a cell is qualified to be camped on or not. After the UE selects the cell and camps on it, in accordance with clause 5.3.3.2 of the 36.331 specification, the UE determines whether access to the E-UTRAN is allowed or not by the system information before the UE can initiate a connection establishment procedure. The access control categories are defined in three service types by the system information as "mobile terminating access", "mobile originating calls", and "mobile originating signaling". If the access of a service is barred, the RRC protocol of the UE starts a corresponding barred access timer and before the barred access timer expires, the corresponding access is prohibited. When the barred access timer expires, the RRC protocol of the UE informs the upper layers that the access is granted, so that the UE can then initiate the connection establishment procedure.

BRIEF SUMMARY OF THE INVENTION

Accordingly, embodiments of the invention provide an apparatus, such as a user equipment (UE) or a chipset of the UE, and a method for alleviating barred access while reselecting from a first cell to a second cell in a mobile communication system. In one aspect of the invention, a UE, alleviating barred access while reselecting from a first cell to a second cell in a mobile communication system, is provided. The UE comprises a wireless module, a storage unit, and a controller. The wireless module receives system information broadcasted in the first cell. The storage unit stores the system information. The controller reselects from the first cell to the second cell according to a reselection criterion based on the signals from the first cell and the second cell, determines whether a first barred access timer is running for indicating an access of a first service is barred in the first cell, and stops the first barred access timer and informs the upper layers of an RRC protocol that the access of the first service is allowed, in response of that the first barred access timer is running.

In another aspect of the invention, a method for alleviating barred access while reselecting from a first cell to a second cell in a mobile communication system is provided. The method comprises receiving system information broadcasted in the first cell, storing the system information in a storage unit, reselecting from the first cell to the second cell according to a reselection criterion based on the signals from the first cell and the second cell, determining whether a first barred access timer is running for indicating that an access of a first service is barred in the first cell, and stopping the first barred access timer and informing the upper layers of an RRC protocol that the access of the first service is allowed in response of that the first barred access timer is running.

In another aspect of the invention, a chipset for alleviating barred access while reselecting from a first cell to a second cell in a mobile communication system is provided. The chipset comprises a storage unit and a controller. The storage unit stores the system information broadcasted in the first cell. The controller reselects from the first cell to the second cell according to a reselection criterion based on the signals from the first cell and the second cell, determines whether a first barred access timer is running for indicating an access of a first service is barred in the first cell, and stops the first barred access timer and informs the upper layers of an RRC protocol that the access of the first service is allowed in response of that the first barred access timer is running.

Other aspects and features of the present invention will become apparent to those of ordinary skill in the art upon review of the following descriptions of specific embodiments of a user equipment, chipset and method for alleviating barred access while reselecting from a first cell to a second cell in a mobile communication system.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. The embodiments described below assume an E-UTRA system. In addition, 3GPP specifications are used to teach the spirit of this invention, but are not limited thereto.

Except for the case that the barred access timer expires, the barred access shall also be alleviated when the UE reselects to another cell of the E-UTRAN. Since the content of the system information includes common information of the E-UTRAN and specific information for only the current cell, the UE shall use only the system information of the new cell and consider the system information of the previous cell invalid when it reselects to another cell. Namely, if the barred access timer started for a service in the previous cell is still running when the UE reselects to a new cell, the UE shall stop the barred access timer and inform the upper layers of the RRC protocol that the access of the service is granted. However, according to the 36.331 specification, when cell reselection occurs, the started barred access timer will be stopped only if the connection establishment procedure on the previous cell has been initiated. In this case, if there is no connection establishment procedure ongoing when cell reselection occurs, the access of the service in the new cell will be determined wrongly by the UE as being barred, even if the system information of the new cell indicates that the access of the service is allowed. Thus, the UE can not perform the connection establishment procedure for the service and use the telecommunication service normally.

Figure 1:
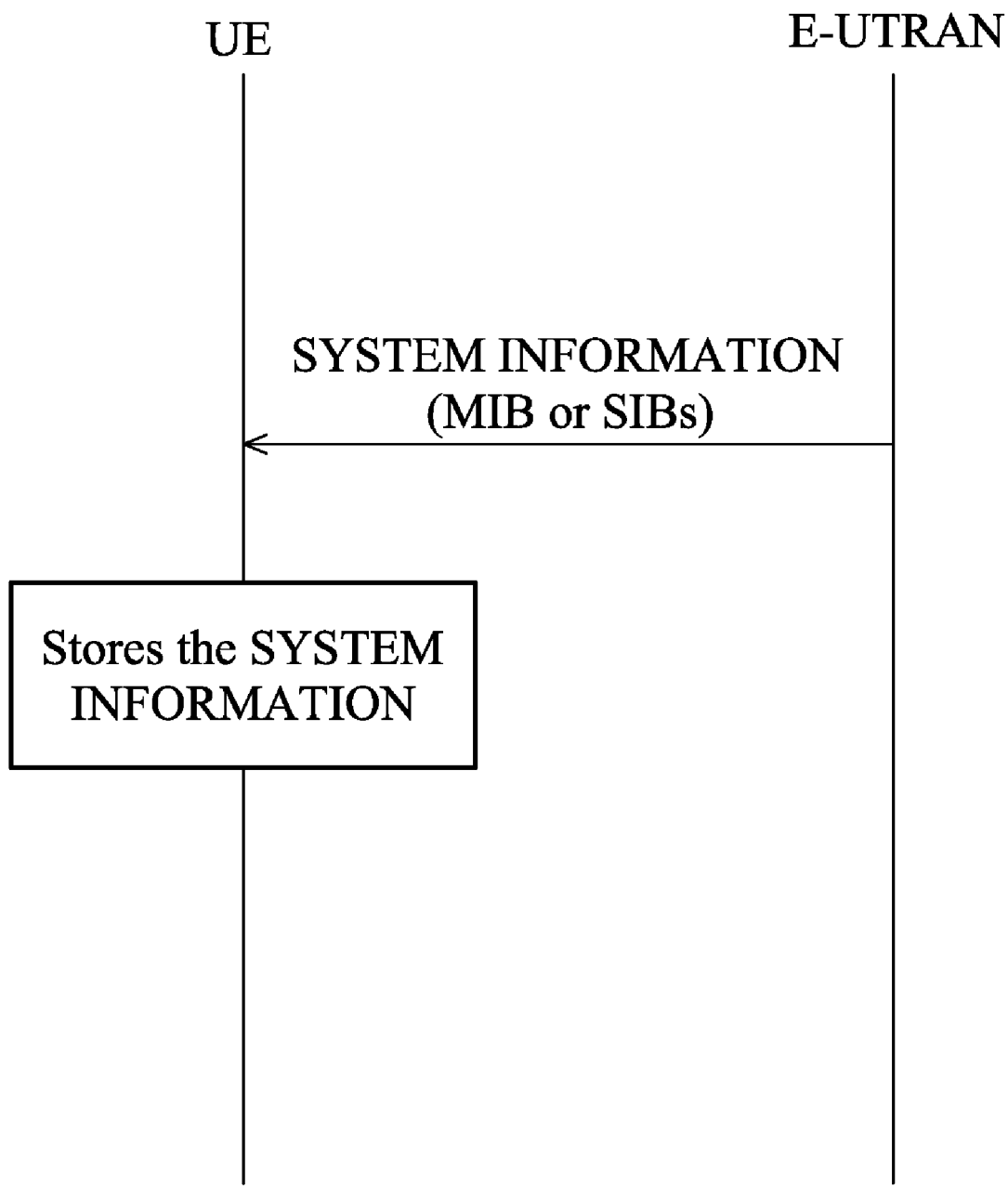
FIG. 1 is a message sequence chart illustrating the broadcast of system information in a UMTS system.
Figure 2:
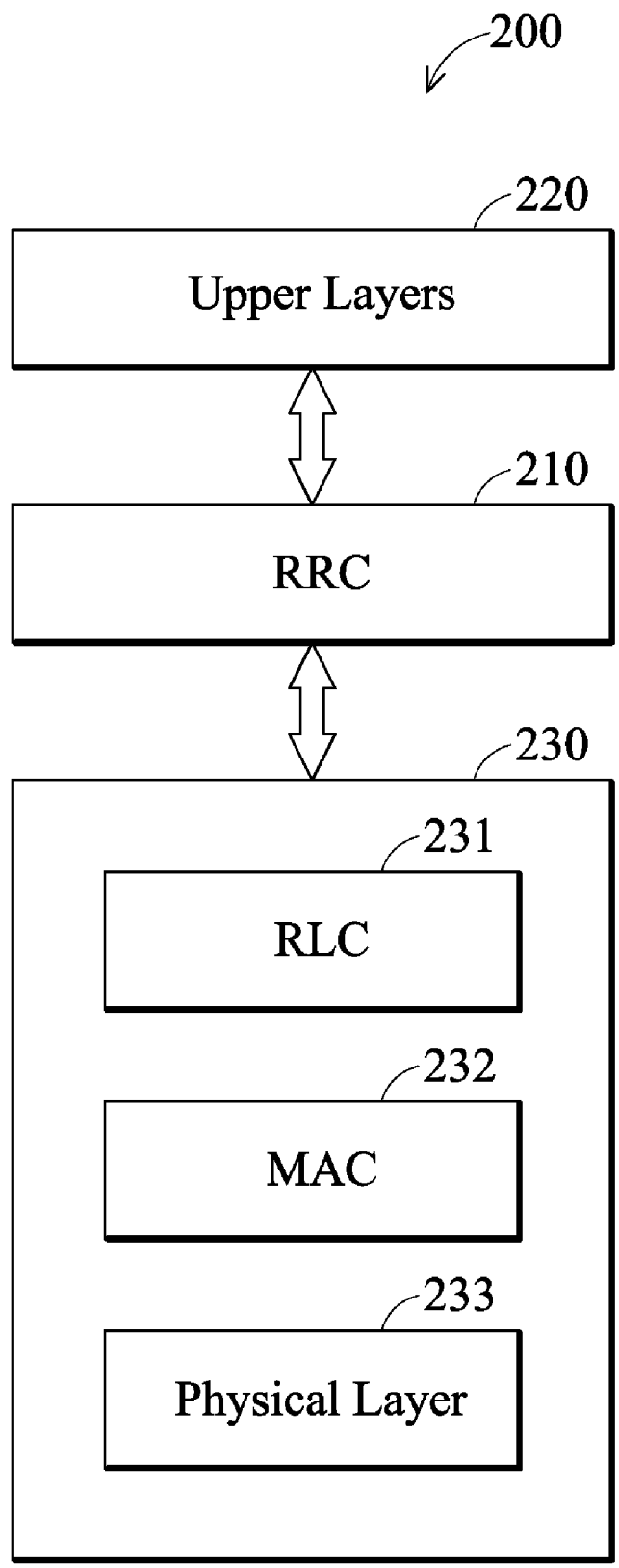
FIG. 2 is a block diagram illustrating a control-plane protocol stack apparatus having a radio resource control (RRC) protocol block according to an embodiment of the invention.

FIG. 2 is a block diagram illustrating a control-plane protocol stack apparatus having an RRC protocol block according to an embodiment of the invention. The RRC protocol stack 210 is a sub-layer of an E-UTRA UE protocol stack 200, and is responsible for providing information transfer services to the upper layers 220 and for controlling the configuration of the lower layers 230, including the radio link control (RLC) protocol 231, the medium access control (MAC) protocol 232, and the physical layer protocol 233. For implementation, any of the protocol stacks referred to hereafter may be realized by software or hardware or combination of both.

After being powered on, a user equipment (UE) will select a suitable cell to camp on to connect to an E-UTRAN for desired telecommunication services. In order to do that, a UE must collect system information broadcasted by the E-UTRAN. The UE determines if a cell is qualified as a suitable cell for the UE to camp on by the cell-selection-reselection criteria specified in the collected system information and the signal strength of the cell. When the UE camps on a cell, it checks the barred access information in the system information before it initiates a connection establishment procedure. If the barred access information indicates that the access of a certain service is barred, the connection establishment procedure will be prohibited and a barred access timer corresponding to the barred service will be started. If the UE remains in the cell, the barred service will stay barred until the timer expires. Otherwise, the UE may reselect a new cell if the signal strength of the new cell better meets the cell-selection-reselection criteria. If so, the system information of the previous cell is considered invalid by the UE, the barred access timer is stopped, and the barred service is alleviated. Nonetheless, in the latter case, a conventional RRC protocol will alleviate the barred service only if there is an ongoing connection establishment procedure for the previous cell. Specifically, if there is no ongoing connection establishment procedure for the previous cell, the UE will consider the barred service in the previous cell also barred in the new cell, even if the service is not barred in the new cell. Advantageously, the RRC protocol stack 210 of the embodiment of the invention will always alleviate the barred service when the UE reselects to a new cell so that appropriate RRC procedures may be normally performed.

Figure 3:
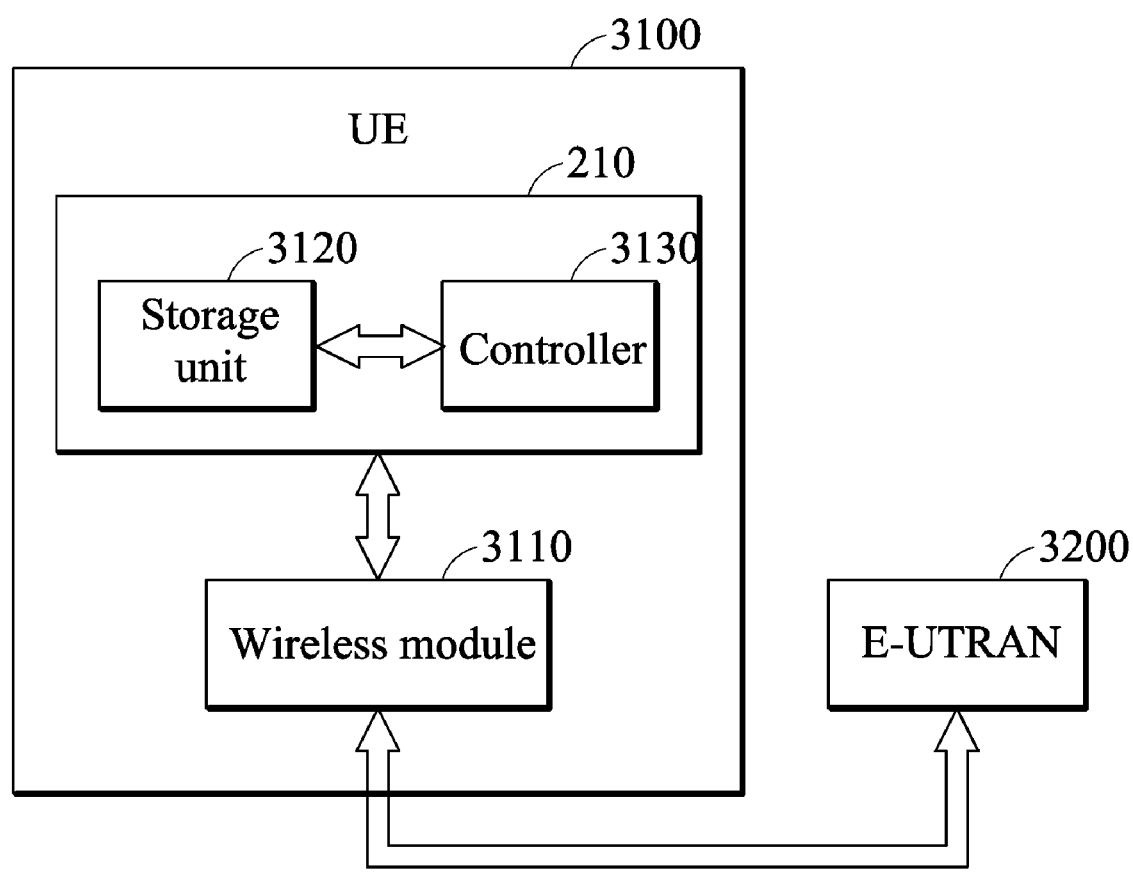
FIG. 3 is a block diagram illustrating in greater detail of the RRC protocol block shown in FIG. 2 in accordance of an embodiment of the invention.

FIG. 3 is a block diagram illustrating in greater detail of the RRC protocol block shown in FIG. 2 in accordance of an embodiment of the invention. The UE 3100 has a wireless module 3110 for receiving system information broadcasted by the E-UTRAN 3200. The UE 3100 also includes the RRC protocol stack 210 depicted in the FIG. 2, which is connected to the E-UTRAN 3200 via the wireless module 3110. The connection between the RRC protocol stack 210 and the wireless module 3110 may involve blocks that are not shown in FIG. 3, such as the protocol stack blocks of FIG. 2. The RRC protocol stack 210 comprises a storage unit 3120 and a controller 3130. The storage unit 3120 stores the received system information for the controller 3130 to retrieve necessary information when needed. The operation of the controller 3130 is explained in more detail in FIG. 4.

Figure 4:
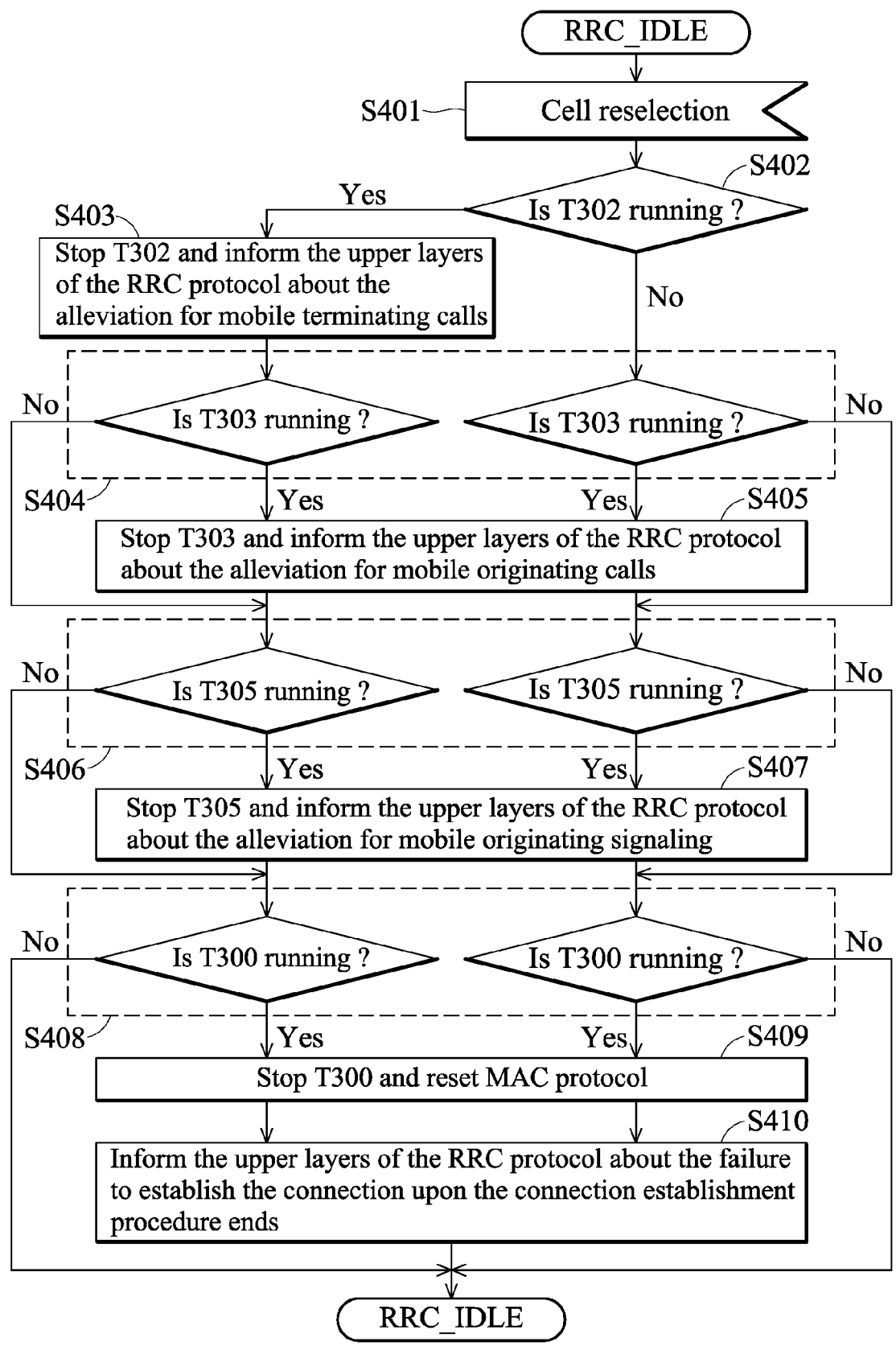
FIG. 4 is a flowchart illustrating the UE operation of the RRC protocol according to an embodiment of the invention.

FIG. 4 is a flowchart illustrating the UE operation of the RRC protocol according to an embodiment of the invention. Referring to FIG. 4, the initial state of the UE is an RRC_IDLE state when the UE is powered on and camps on a current cell. By the time the UE enters the RRC_IDLE state, the system information broadcasted in the current cell was received and stored in the storage unit 3120. When a new cell is found to be more suitable to camp on according to the cell-selection-reselection criteria, the UE reselects to the new cell (step 401). Upon cell reselection, the UE determines whether a first barred access timer T302 is running for indicating that the mobile terminating access is barred in the current cell (step 402). If the first barred access timer T302 is running, the UE stops the barred access timer T302 and informs the upper layers of the RRC protocol about the alleviation for mobile terminating access (step 403). Secondly, the UE determines whether a second barred access timer T303 is running for indicating that the mobile originating calls are barred in the current cell (step 404). If the second barred access timer T303 is running, the UE stops the barred access timer T303 and informs the upper layers of the RRC protocol about the alleviation for mobile originating calls (step 405). Thirdly, the UE determines whether a third barred access timer T305 is running for indicating that the mobile originating signaling is barred in the current cell (step 406). If the third barred access timer T305 is running, the UE stops the third barred access timer T305 and informs the upper layers of the RRC protocol about the alleviation for mobile originating signaling (step 407). Lastly, the UE determines whether a guard timer T300 is running for indicating that the RRC connection establishment procedure is ongoing for the current cell (step 408). If the connection establishment guard timer T300 is running, the UE stops the connection establishment guard timer T300, resets the MAC protocol 232 (step 409), and upon ending of the RRC connection establishment procedure, informs the upper layers of the RRC protocol that the RRC connection establishment procedure has failed (step 410). After all the barred access timers and connection establishment guard timer are determined, the corresponding functions and resources are reset. And thus, the UE remains in the RRC_IDLE state and the UE may continue to normally operate.

As described in FIG. 4, T302 is determined before T303 and T303 is determined before T305 because the durations of T302, T303, and T305 are in a specific order. In some embodiments, the durations of T302, T303, and T305 are set in an ascending order. While in other embodiments, the durations of T302, T303, and T305 are set in a descending order.

Figure 5:
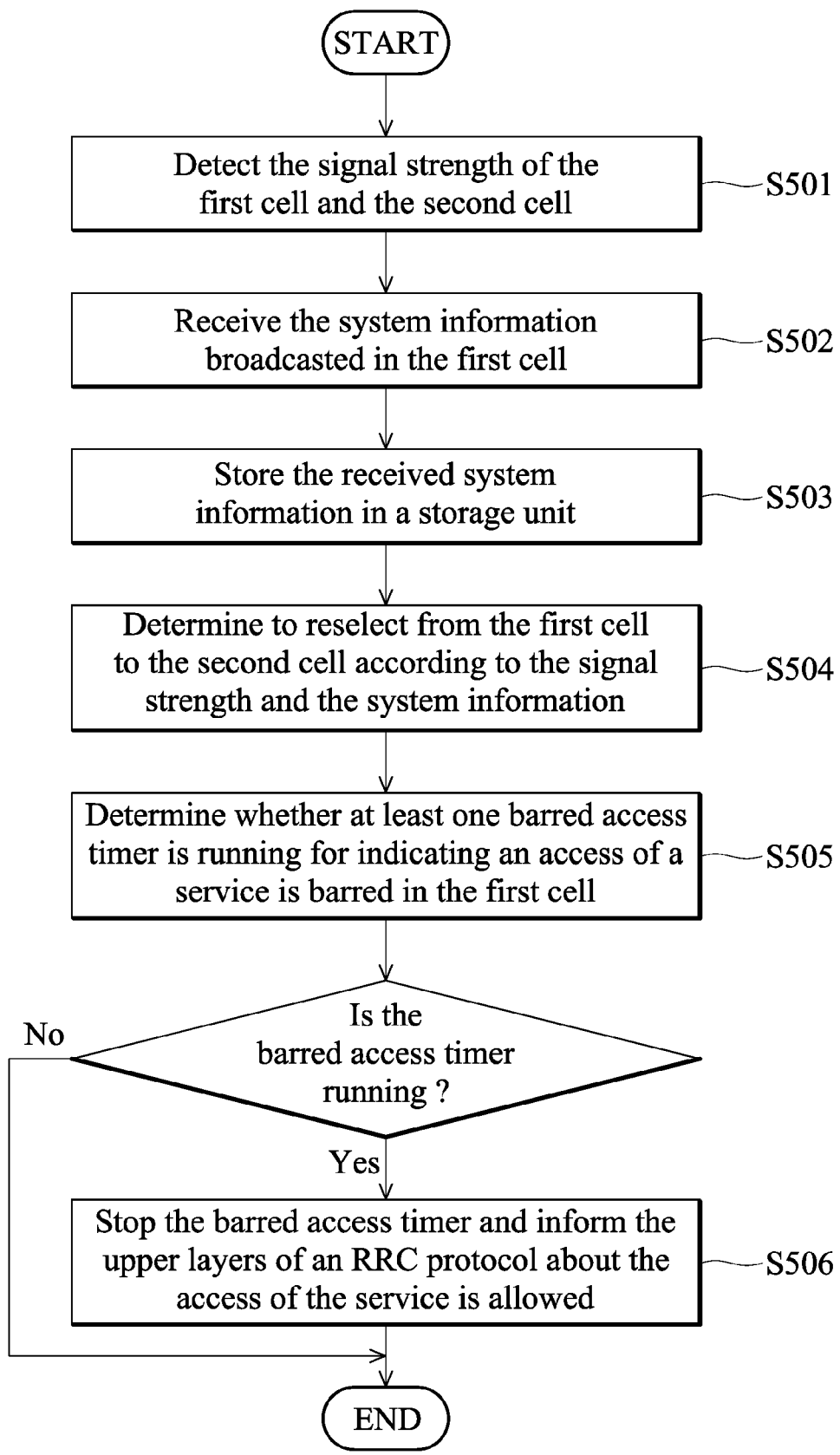
FIG. 5 is a flowchart illustrating the process of the method for a UE RRC protocol according to an embodiment of the invention.

FIG. 5 is a flowchart illustrating the process of the method for a UE RRC protocol according to an embodiment of the invention. The process starts after UE 3100 is powered on and camped on the first cell. At first, UE 3100 detects the signal strength of the first cell and the second cell (step S501). UE 3100 next receives the system information broadcasted in the first cell (step S502) and stores the received system information in a storage unit (step S503). If the second cell appears to be a better cell to be camped on, UE 3100 determines to reselect from the first cell to the second cell according to the signal strength and the system information (step S504). Upon cell reselecting to the second cell, UE 3100 determines whether at least one barred access timer is running for indicating an access of a service is barred in the first cell (step S505). If the barred access timer is not running, the process ends. Otherwise (the barred access timer is running), UE 3100 stops the barred access timer and informs the upper layers of an RRC protocol about the access of the service is allowed (step S506) and the process ends.

In one embodiment, UE selects a new cell according to a reselection criterion based on signals from an old cell and the new cell. The criterion may include signal strength, system information, available channel, available service, or any other well-known factors. The present invention does not specify or restrict the usage of any reselection criterion in embodiments. In an embodiment, the barred access timer may be related to mobile terminating access, mobile originating access, and/or mobile originating signaling service. The specification does not limit the scope of access timer into these three kinds of services above. And the multiple barred access timers may be determined in a numerical order, ascendant or descendant.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A user equipment for alleviating barred access while reselecting from a first cell to a second cell in a mobile communication system, comprising:
a wireless module receiving system information broadcasted in the first cell;
a storage unit storing the system information; and
a controller configured to perform the following:
reselecting the user equipment from the first cell to the second cell according to a reselection criterion based on signals from the first cell and the second cell received by the wireless module;
determining whether a first barred access timer is running for indicating an access of a first service is barred in the first cell, in response to reselecting from the first cell to the second cell;
stopping the first barred access timer and informing upper layers of a radio resource control (RRC) protocol about the access of the first service is allowed in response of that the first barred access timer is running;
determining whether a second barred access timer is running for indicating an access of a second service is barred in the first cell, in response to reselecting from the first cell to the second cell; and
stopping the second barred access timer and informing the upper layers of the RRC protocol about the access of the second service is allowed in response of that the second barred access timer is running,
wherein the first and the second barred access timer are chosen from any combination among barred access timers relating to the service of mobile terminating access, relating to the service of mobile originating call, and relating to the service of mobile originating signaling, and a first duration of the first barred access timer and a second duration of the second barred access timer are in a predetermined numerical order.

2. The user equipment of claim 1, wherein the controller further determines whether a connection establishment guard timer is running for indicating an RRC connection establishment procedure is initiated, in response of that the first barred access timer is not running, and stopping the connection establishment guard timer, resetting a medium access control (MAC) protocol, and informing the upper layers of the RRC protocol that the RRC connection establishment procedure is failed, in response of that the connection establishment guard timer is running.

3. The user equipment of claim 1, wherein the controller further determines whether the access of the first service is barred in the first cell according to the system information, and starts the first barred access timer in response of that the access of the first service is barred.

4. The user equipment of claim 1, wherein the mobile communication system is an Evolved Universal Terrestrial Radio Access (E-UTRA) system.

5. A method for a user equipment to alleviate barred access while reselecting from a first cell to a second cell in a mobile communication system, comprising:
   receiving system information broadcasted in the first cell;
   storing the system information in a storage unit;
   reselecting from the first cell to the second cell according to a reselection criterion based on signals from the first cell and the second cell;
   determining whether a first barred access timer is running for indicating an access of a first service is barred in the first cell, in response to reselecting from the first cell to the second cell;
   stopping the first barred access timer and informing upper layers of a radio resource control (RRC) protocol about the access of the first service is allowed, in response of that the first barred access timer is running;
   determining whether a second barred access timer is running for indicating an access of a second service is barred in the first cell, in response to reselecting from the first cell to the second cell; and
   stopping the second barred access timer and informing the upper layers of the RRC protocol about the access of the second service is allowed in response of that the second barred access timer is running,
   wherein the first and the second barred access timer are chosen from any combination among barred access timers relating to the service of mobile terminating access, relating to the service of mobile originating call, and relating to the service of mobile originating signaling, and a first duration of the first barred access timer and a second duration of the second barred access timer are in a predetermined numerical order.

6. The method of claim 5, further comprising determining whether a connection establishment guard timer is running for indicating an RRC connection establishment procedure is initiated, in response of that the first barred access timer is not running, and stopping the connection establishment guard timer, resetting a medium access control (MAC) protocol, and informing the upper layers of the RRC protocol that the RRC connection establishment procedure is failed in response of that the connection establishment guard timer is running.

7. The method of claim 5, further comprising determining whether the access of the first service is barred in the first cell according to the system information, and starting the first barred access timer in response of that the access of the first service is barred.

8. The method of claim 5, wherein the mobile communication system is an E-UTRA system.

9. A chipset for a user equipment to alleviate barred access while reselecting from a first cell to a second cell in a mobile communication system, comprising:
   a storage unit storing system information broadcasted in the first cell; and
   a controller configured to perform the following:
   reselecting from the first cell to the second cell according to a reselection criterion based on signals from the first cell and the second cell;
   determining whether a first barred access timer is running for indicating an access of a first service is barred in the first cell, in response to reselecting from the first cell to the second cell;
   stopping the first barred access timer and informing upper layers of a radio resource control (RRC) protocol about the access of the first service is allowed in response of that the first barred access timer is running;
   determining whether a second barred access timer is running for indicating an access of a second service is barred in the first cell, in response to reselecting from the first cell to the second cell; and
   stopping the second barred access timer and informing the upper layers of the RRC protocol about the access of the second service is allowed in response of that the second barred access timer is running,
   wherein the first and the second barred access timer are chosen from any combination among barred access timers relating to the service of mobile terminating access, relating to the service of mobile originating call, and relating to the service of mobile originating signaling, and a first duration of the first barred access timer and a second duration of the second barred access timer are in a predetermined numerical order.

10. The chipset of claim 9, wherein the controller further determines whether a connection establishment guard timer is running for indicating an RRC connection establishment procedure is initiated, in response of that the first barred access timer is not running, and stopping the connection establishment guard timer, resetting a medium access control (MAC) protocol, and informing the upper layers of the RRC protocol that the RRC connection establishment procedure is failed, in response of that the connection establishment guard timer is running.

11. The chipset of claim 9, wherein the controller further determines whether the access of the first service is barred in the first cell according to the system information, and starts the first barred access timer in response of that the access of the first service is barred.

12. The chipset of claim 9, wherein the mobile communication system is an E-UTRA system.

* * * * *